April 9, 1968  D. E. MORROW  3,376,948
STREAMER COUPLER
Filed Dec. 30, 1966  3 Sheets-Sheet 1

INVENTOR
DONALD E. MORROW

René E. Grossman
ATTORNEY

April 9, 1968   D. E. MORROW   3,376,948
STREAMER COUPLER

Filed Dec. 30, 1966   3 Sheets-Sheet 2

INVENTOR
DONALD E. MORROW
René E. Grossman
ATTORNEY

INVENTOR
DONALD E. MORROW
René E. Grossman
ATTORNEY

# United States Patent Office 3,376,948
Patented Apr. 9, 1968

3,376,948
STREAMER COUPLER
Donald E. Morrow, Irving, Tex., assignor to Texas Instruments Incorporated, Dallas, Tex., a corporation of Delaware
Filed Dec. 30, 1966, Ser. No. 607,599
6 Claims. (Cl. 181—.5)

ABSTRACT OF THE DISCLOSURE

A coupler for connecting a pair of streamer sections comprising a pair of thin-walled shells forming a housing, housing insertion means mounted in the forward part of each pair of shells and having grooves located around its outer perimeter, sealing means in each of the grooves, external buoyant fluid filler and air bleed ports penetrating the shells, mating electrical connector halves in the hollow interior of each of the housing insertion means and tension receptacle means mounted in the rearward part of each of the shells for receiving the strain wires from the streamer section.

---

This invention relates to couplers and more particularly to a coupler for connecting one marine seismic streamer section to another.

It is an object of this invention to provide a coupler which may be adapted for marine operations which is of high reliability.

Another object of this invention is to provide a marine coupler which is impervious to the intrusion of sea water.

Another object of this invention is to provide a marine coupler which allows spot filling of streamer sections without disconnecting the streamer sections.

A still further object is to provide a seismic streamer coupler which isolates any electrical connectors and wires from the strain wires included therein.

Other objects and features of the invention will become more readily understood from the following detailed description and appended claims when read in conjunction with the accompanying drawings, in which like reference numerals designate like parts throughout the figures thereof, and in which:

Figure 1:
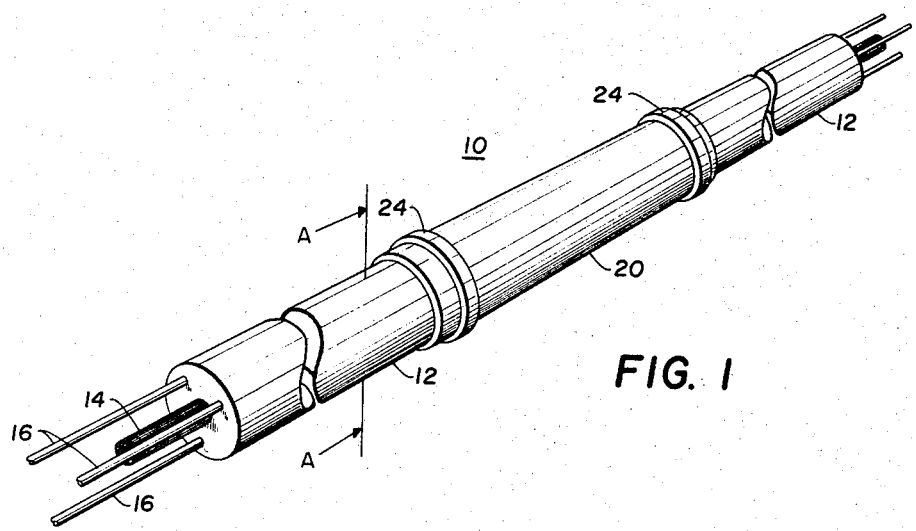
FIGURES 1, 1A and 1B are perspective and cross-sectional views, respectively, of a "boot" section formerly used in marine seismic streamers.
Figure 1A:
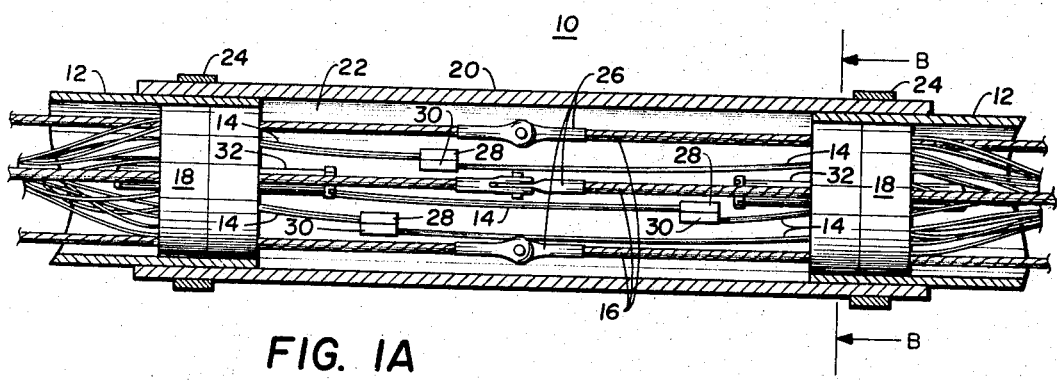
Figure 1B:
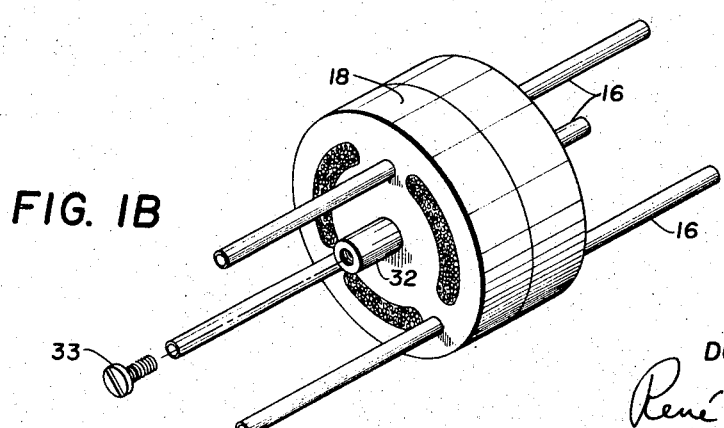

Referring now to FIGURES 1, 1A and 1B, there is illustrated a marine seismic streamer 10 which is comprised of many 100 foot sections 12 (only two being shown) of oil-filled flexible plastic tubing coupled end-to-end. Included in these sections 12 are hydrophones (not shown) for sensing minute pressure changes, electrical wires 14 for transmission of electrical signals to a recording boat, strain wires 16 for kinematic loading and plastic spacers or glands to maintain rigidity of the plastic tubing. The streamer sections 12 each are coupled together by means of short plastic "boot" sections 20 made of polyvinylchloride (PVC) tubing. The interior 22 of boot section 20 is filled with oil by the insertion of a flat tube (not shown) between seismic streamer section 12 and boot 20 and pumping oil therein. When the boot section is essentially full of oil, the flat tube is removed and hose clamps 24 are tightened over gland 18.

Mechanical coupling across boot section 20 is provided by terminating strain wires 16 in tongue-clevis-pin cable fittings 26. Electrical coupling is achieved by using two electrical panel connectors 28 and 30. Signal electrical wires 14 and strain wires 16 extend through sealing glands 18 (shown in detail in FIGURE 1B) and are secured tightly by hose clamps 24 on each end of the streamer sections. The boot 20 is installed after the strain wires and signal wires are appropriately coupled as shown in FIGURE 1A. The boot is filled with oil and clamped at its extremities, as before mentioned, with hose clamps 24 to prevent oil leakage and sea water seepage. Prior to sea.ing the boot section, streamer sections 12 may be filled with oil by pumping oil through filler tube 32 inserted in gland 18.

During recording operations, streamer 10 is towed at speeds up to approximately 5 knots. The streamer, extending to a length of up to approximately 7800 feet, may occasionally strike the ocean bottom reefs, shell beds or submerged objects, resulting in pin holes or rips in the plastic tubing and usually loosening the hose clamps 24 which permits loss of oil and seepage of sea water into the boot. The salt water intrusion into the electrical connectors 28 and 30 results in electrical leakage and shorting. When this occurs, the boots at each end of the damaged section must be removed to allow replacement of that section. The boots must then be replaced and refilled with oil. If the electrical connectors 28 and 30 become contaminated by sea water, they must be disassembled and cleaned which is a very tedious and time consuming task that must be performed on the recording boat.

The streamer sections normally lose small amounts of oil due to seepage. This oil must be replaced periodically to insure proper buoyancy and correct functioning of the streamer as a geophysical instrument. Replacement of the oil in streamer sections 12 requires that the boot be drained and removed to gain access to oil filler tube 32 contained in sealing gland 18 (shown in FIGURE 1B). After the section is filled to the proper oil level, oil filler cap 33 is reinserted in tube 32 and then the boot is replaced and refilled with oil.

The arrangement of strain wires 16 and boot 20 create certain difficulties. These strain wires which are coupled through the boot are continuous throughout the entire length of streamer 10. These wires are constrained to their relative positions only by friction offered by sealing glands 18 spaced at the ends of the sections. The strain wires 16 shown in FIGURE 1B form an equilateral triangle with the strain wires at the vertices and the electrical connectors 28 and 30 (shown in FIGURE 1A) floating freely inside the triangle. As the streamer 10 is rolled up on its reel (not shown) for storage which is located on the recording boat, the cross-section of boot 20 tends to flatten, approaching a line configuration, which causes the strain wires 16 to saw and chafe electrical connectors 28 and 30 and electrical signal wires 14. This results in breaks and electrical short circuits which can only be repaired after removal of the boot and considerable down time of the streamer.

Figure 2:
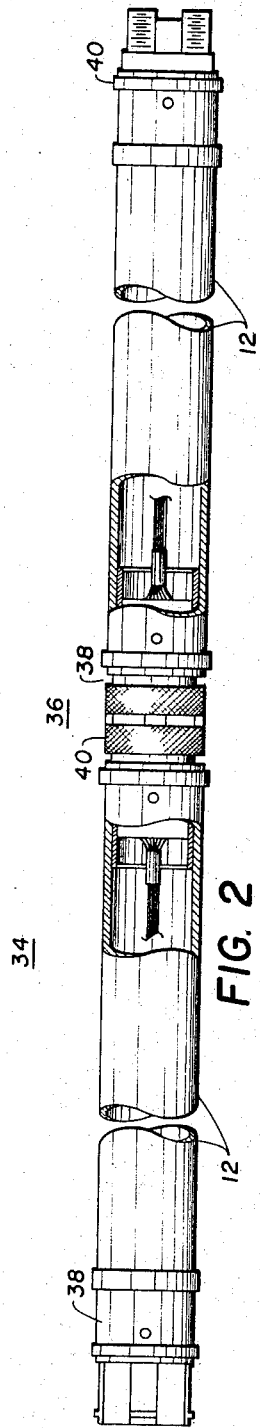
FIGURE 2 is a seismic marine streamer utilizing the coupler of this invention.

In FIGURE 2, there is shown a marine seismic streamer 34 comprised of 100 foot streamer sections 12 which, like streamer 10 shown in FIGURE 1, includes hydrophones, strain, wires and electrical signal wires, but with the "boot" section 20 replaced by streamer coupler 36. This streamer coupler 36 shown in FIGURE 2 is illustrated with coupler halves 38 and 40 in the locked position. Each section 12 may have opposite type coupler halves 38 and 40 connected at its extremities.

Figure 3:
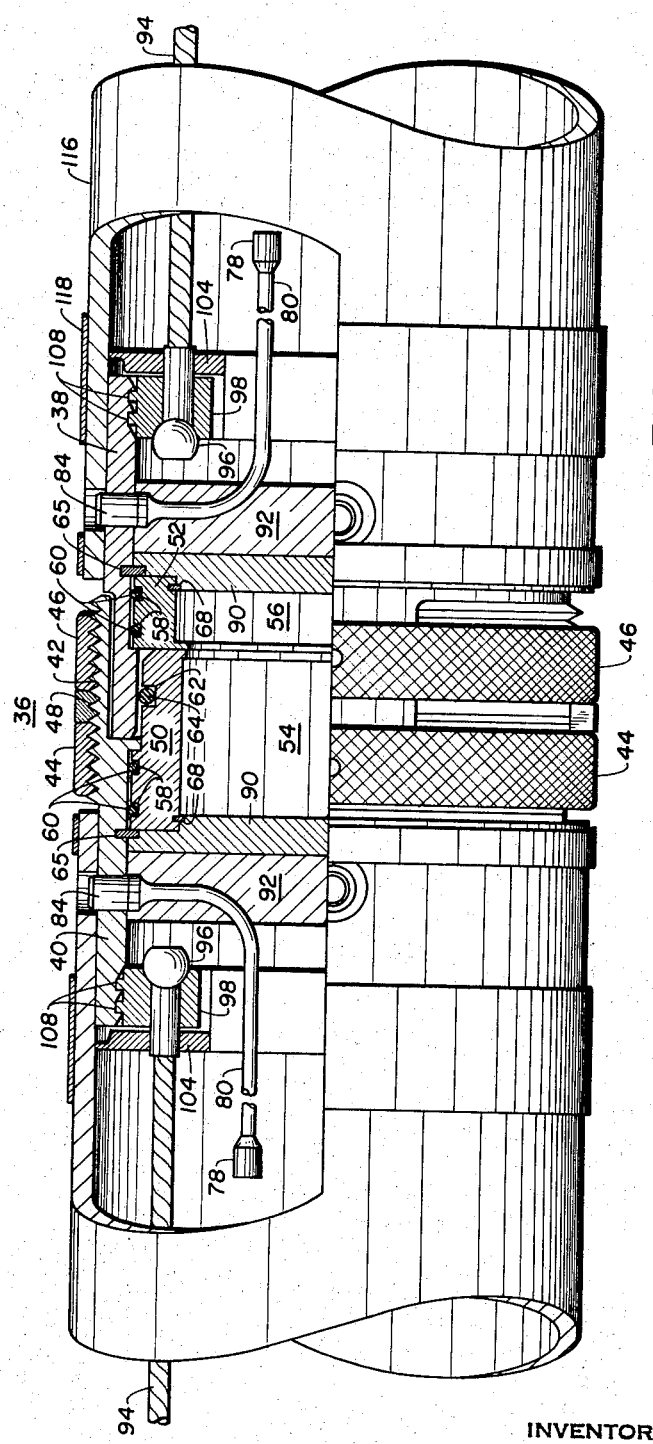
FIGURE 3 is a quarter cross-sectional view of the marine coupler.
Figure 4:
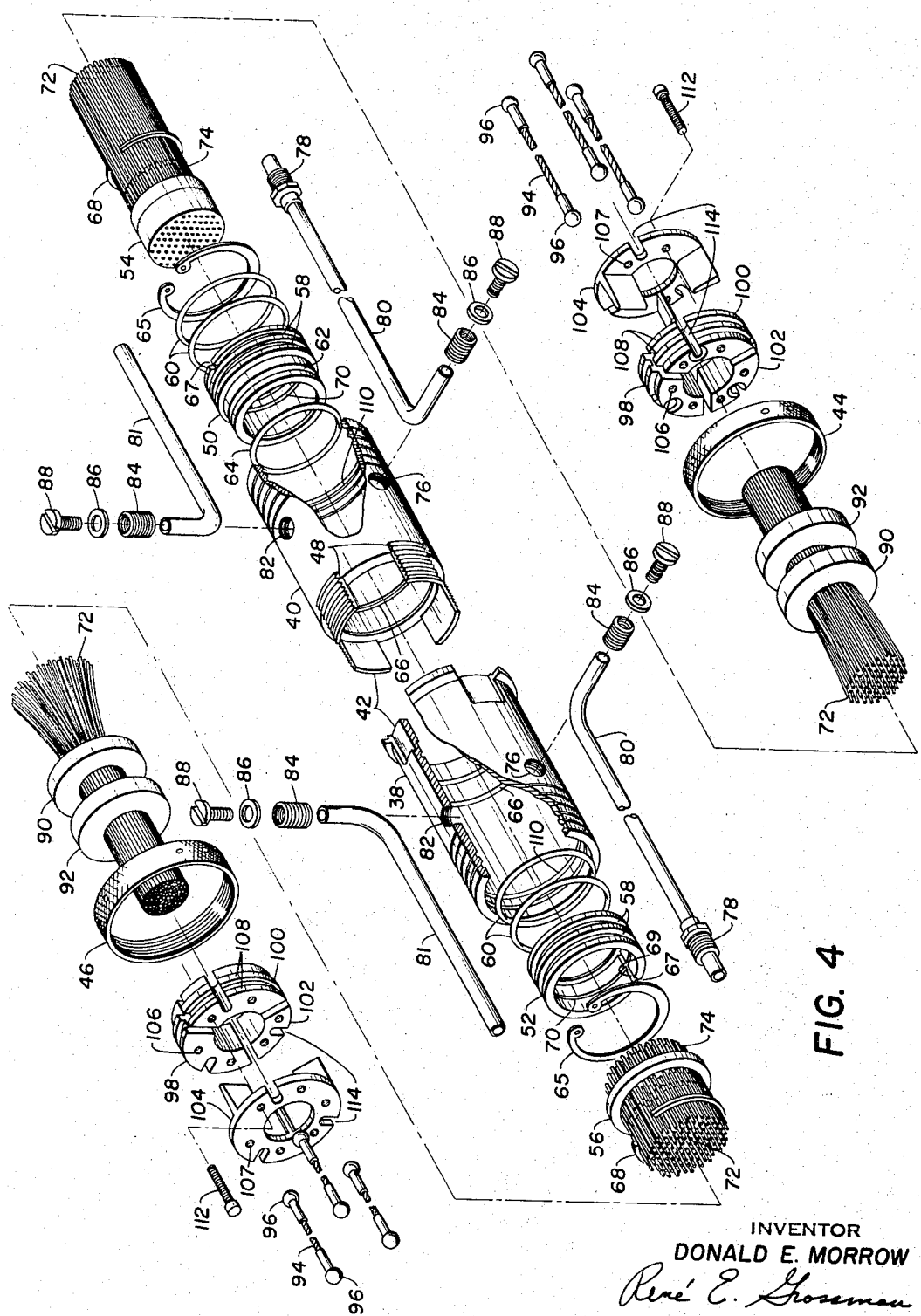
FIGURE 4 is an exploded perspective view of the coupler of this invention.

FIGURE 3 and FIGURE 4 will be described together. FIGURE 3 shows a partial section view of the locked assembled coupling 36 of FIGURE 2. FIGURE 4 illustrates an exploded perspective view of coupler 36. Coupler halves 38 and 40 are thin walled stainless steel shells coupled at the center by an interrupted thread-lug-retainer ring arrangement 42. These coupler halves or thin-walled shells 38 and 40 when locked form a rigid housing and transfer the stream tension from one section to another. Retainer rings 44 and 46 engage threaded lugs 48 and hold rigidly together and lock coupling half 38 to coupling half 40. Housing inserts 50 and 52 support electrical connector halves 54 and 56, respectively. These inserts may be formed from aluminum for weight economy. Each insert has two grooves 58 formed around its outside diameter; O rings 60 fit in grooves 58 formed around its outside diameter; O rings 60 fit in grooves 58 and form a pressure seal on the outside diameter of inserts 50 and 52 which prevent pressure leakage of sea water into the streamer sections. Housing insert 50 has a third groove 62 formed in it, the outside diameter of which is smaller than grooves 58. O ring 64 seals the mated coupling halves 38 and 40 from sea water intrusion. Inserts 50 and 52 are locked into the shell cavity by snap rings 65 which fit in grooves 66 located on the inner surface of coupler halves 38 and 40.

Electrical connector halves 54 and 56 are positioned within the housing inserts 50 and 52, respectively. The connector halves are oriented to their mating counterparts by means by a keyway 67 formed in each housing insert and the stainless steel outer shell halves. The coupler halves 38 and 40 are keyed by an odd size lug 48. The insertion of snap rings 68 in the grooves 70 formed on the inside diameter of housing inserts 50 and 52 lock electrical connector halves 54 and 56 in their respective inserts. Keyways 69 formed transversely across the interior of inserts 50 and 52 insure proper alignment of electrical connector halves in the inserts. Electrical signal wires 72 are connected to the appropriate pins 74 in mating electrical connectors 54 and 56.

An external filler port 76 which penetrates the coupler halves 38 and 40 is connected to an inner tube valve 78 (such as Schrader tank valve 1468A) by a short flexible tube 80. An air bleed port 82 is provided in the same manner but does not contain a check valve. Situated in oil filler port 76 and air bleed port 82 is a threaded insert 84. O ring 86 and screw 88 insure that each port is tightly sealed. This filler port 76 provides an external opening to the interior of a streamer section for filling the section with oil or any buoyant fluid, such as Dow Corning silicone DC-200.

Pressure sealing and containment of oil is achieved in each coupling half 38 and 40 by back sealing the electrical connector halves 54 and 56 and its respective housing insert with a potting compound 90 such as Thiokol Polymer Potting Compound. The shell cavity is then filled with a hard epoxy compound 92, such as Scothcast 221 Epoxy, to encapsulate the signal wires 72 and flexible tubes 80 and 81 and to provide a hermetic seal for the coupling halves. The epoxy compound 92 also provides strain relief for the signal wires.

Strain wires 94 are terminated in each coupling half by ball and shank swaging fittings 96. These fittings 96 are secured in the coupler halves by a four piece ring assembly comprised of three identical segments 98, 100 and 102 and retainer block 104. Each segment has two threaded-through holes 106 which are in lines with holes 107 in retainer block 104. Ridges 108 running longitudinally around the outer diameter of segments 98, 100 and 102 fit in grooves 110 located towards the rear of coupler halves 38 and 40. Segments 98, 100 and 102 are retained and fixedly held by retainer block 104 by the insertion of screws 112 in the threaded-through holes 106 and 107. The slots 114 in the segments and retainer block accommodate the strain wires 94 and ball and shank swaging fittings 96. This arrangement allows the streamer tension to be transferred from the strain wires to the coupling and insures that no bending or local buckling is introduced.

A polyurethane jacket material 116 or similar type material surrounds the ends of each coupling half 38 and 40 and is secured thereto by means of Punch-Lok bands 118.

As shown in FIGURE 2, each 100 foot section 12 has at its extremity a different coupler half 38 or 40. Proper alignment and locking of one coupler half 38 to the other 40 is assured by means of keyways machined into the aluminum housing inserts 50 and 52 and the coupling halves; further the coupler halves are keyed by an odd size lug 48 which allows only one position in which the two coupler halves can be joined together. The assembled coupling halves are held rigidly together by an interrupted thread-lug-arrangement 42 and retained in place by stainless steel rings 44. These rings screw onto threaded lugs 48 until each coupler half is rigidly held together. Electrical continuity is insured through electrical connectors 54 and 56, and more particularly through pin contacts 74 and the electrical wires 72 connected thereto. As mentioned previously, O rings 60 and 64 prevent sea water from intruding into the coupler halves.

Because the streamer occasionally comes into contact with submerged objects which may loosen Punch-Lok bands 118, loss of oil in streamer sections 12 may occur. When this occurs in the streamer described in FIGURE 1, a substantial delay in seismic recording operations would occur due to the necessity of removing boot section 20 to permit pumping of oil into streamer section 12 via oil filler tube 32 (shown in FIGURE 1B). With the coupler of this invention, the streamer sections 12 which have had oil, for example, or other buoyant fluid seep out may be refilled without disconnecting the coupler halves 38 and 40 by using external oil filler port 76. By removing screws 88 from oil filler port 76 and air bleed port 82, oil may be pumped into the appropriate streamer section via inner tube valve 78 and tube 80. The air present in the streamer is evacuated through flexible tube 81, which extends into streamer section 12, and out through air bleed port 82. When the streamer section 12 is filled with oil, pumping of oil is terminated and check valve 78 closes thereby not allowing the oil in the streamer to exit back through oil filler port 76. O rings 86 and screws 88 are then reinserted into the coupler halves. Although oil filler and air bleed ports might be formed in but one coupler half, with ports of each type located in each coupler half, it is possible to fill simultaneously with oil two streamer sections. This feature along with the advantage of not having to disconnect the connectors to refill streamer section 12 allows a substantial savings in time in marine recording operations. Further, sections of damaged streamers can be quickly disconnected and replaced by spares using the coupler of this invention which offers another substantial savings in time over the boot previously described. It should be further noted that the strain wires are isolated from the electrical connectors and wires which avoids the sawing and chafing of electrical connectors and signal wire bundles previously present in the boot described above.

Although the present invention has been shown and illustrated in terms of the specific invention, it will be apparent that the changes and modifications can be made without departing from the spirit and scope of the invention as defined by the appended claims.

What is claimed is:
1. A seismic coupler for connecting electrical signal and strain wires from one streamer section to another, comprising:
(a) a pair of thin-walled shells which form a housing,
(b) housing insertion means fixedly mounted in the forward part of each pair of said shells, each of said insertion means having a hollow interior with grooves located around its outer perimeter,
(c) sealing means in each of said grooves to form a fluid-tight seal,
(d) mating electrical connector halves positioned in the hollow interior of each of said housing insertion means providing electrical continuity of said signal wires, (e) external buoyant fluid filler and air bleed ports penetrating at least one of said pair of shells for providing said sections with buoyant fluid, and (f) tension receptacle means fixedly mounted in the rearward part of each of said shells for receiving said strain wires from said streamer sections.

2. A seismic coupler according to claim 1 wherein said sealing means comprises O-ring fittings.

3. A seismic coupler according to claim 1 wherein said pair of shells are coupled by a threaded-lug-retainer ring.

4. A marine seismic coupler for connecting electrical signal and strain wires from one streamer section to another, comprising (a) a pair of thin-walled cylindrical shells including a a locking means at each mating extremity of said shells, (b) hollow annular inserts, each fixedly positioned at the mating extremity ends of said shells having grooves formed on the outside diameter of said inserts, (c) O-ring fittings inserted in said outside diameter grooves for pressure sealing said coupler from fluid intrusion, (d) mating electrical connector halves, each rigidly held by said hollow annular inserts for providing electrical continuity of said signal wires, (e) external fluid filler and air bleed ports penetrating at least one of said pair of shells for providing said sections with fluid, and (f) ring assembly means fixedly mounted in the rearward part of each of said shells for receiving said strain wires from said streamer sections.

5. A marine seismic coupler according to claim 4 including back sealing means between said ring assembly and the connector-insert combination for providing pressure sealing of said couplers and containment of buoyant fluid in said sections.

6. A marine seismic coupler according to claim 5 wherein said back sealing means is an epoxy compound.

References Cited
UNITED STATES PATENTS 2,465,696   3/1949   Paslay _____ 18—0.5
3,290,645   12/1966  Pavey et al. _____ 340—7

SAMUEL FEINBERG, *Primary Examiner.*

W. KUJAWA, *Assistant Examiner.*